INVENTOR.
PERCY N. KRUYTHOFF AND SIPKO L. BOERSMA

BY Wenderoth, Lind & Ponack
ATTORNEYS

INVENTOR.
PERCY N. KRUYTHOFF AND SIPKO L. BOERSMA
BY
Wenderoth, Lind & Ponack
ATTORNEYS INVENTOR.
PERCY N. KRUYTHOFF AND SIPKO L. BOERSMA
BY
Wenderoth, Lind & Ponack
ATTORNEYS INVENTOR.
PERCY N. KRUYTHOFF AND SIPKO L. BOERSMA
BY
Wenderoth, Lind & Ponack
ATTORNEYS

United States Patent Office 3,191,487
Patented June 29, 1965

3,191,487

OPTICAL SYSTEM HAVING LIGHT DISPERSING MEANS FOR TRANSMITTING AND RECEIVING AN IMAGE OF AN OBJECT

Percy Norman Kruythoff and Sipko Luu Boersma, Delft, Netherlands, assignors to N.V. Optische Industrie "De Oude Delft," Delft, Netherlands Filed July 10, 1961, Ser. No. 123,057
Claims priority, application Netherlands, July 9, 1960, 253,627
3 Claims. (Cl. 88—1)

The invention relates to a system for transmitting and receiving optical images along an optical path. More particularly, the invention relates to a system for optical image transmission in which from each point of the object of which an image is to be transmitted a colored beam of light is derived whose spectral composition is representative for the position of the image point in the image and wherein the colored light beams are combined and transmitted to an image space in which they are separated so as to form the image.

Methods and systems of this kind which make use of the large number of different colors that may be distinguished in the spectrum of natural light to identify the image points which together make up the complete image, are well known in the art. These known systems have certain essential drawbacks, however, which severely restrict their practical application.

A first restriction is that the prior systems make use of a continuous line-shaped spectrum which illuminates one image line of the object, e.g. a transparent tape bearing black characters or similar signs. In order to transmit the complete message on the tape the object is scanned by the line-shaped spectrum in the direction perpendicular to the spectrum so that the image lines are transmitted one after the other in a way much similar to television techniques. Such scanning may be performed by moving the tape lengthwise across the spectrum or by rotating suitable optical members such as polygonal prisms and mirrors. Of course, this scanning necessitates a perfect synchronisation of the scanning means on the transmitting and the receiving end of the path which is very difficult to establish and maintain. Moreover, this type of transmission requires a substantial time to be completed.

A further restriction resides in that no colored images can be transmitted as the system though making use of the spectral colors of natural light may essentially be considered as a black-and-white system which can be only discriminate between different shades of grey.

Accordingly, the present invention has for its object to remedy these deficiencies. More specifically, it is amongst the objects of the invention to provide a system which, if desired, is capable of instantaneously transmitting complete images having more than one dimension (surface and space images). Another object is to provide a system of the type referred to which is capable of transmitting images of objects in their natural colors.

The image transmission according to the invention, broadly, comprises the steps of dividing the distinguishable colors available for the transmission in at least two primary groups which each represent a value or quality of a first characteristic of the image to be transmitted, dividing each of said primary groups in distinguishable colors or subdividing each of said primary groups at least once in further groups of distinguishable colors which each represent a value or quality of a further characteristic of the image to be transmitted, whereby each of said distinguishable colors is made representative of one value or quality of each of the characteristics of the image to be transmitted.

In order to facilitate full understanding of the invention in its several aspects the following definitions are given of certain terms used in the present description and the claims attached thereto:

An image or object point is to be understood as the smallest elementary part of the object or image which should be resolved from its neighbours when transmitting the image. A row of adjacent object or image points defines a line of the object or image.

The term "distinguishable color" is used to designate a narrow frequency band in the spectrum of light. Herein the word light is to be understood to include also the infrared and ultraviolet regions of the spectrum adjacent the visible region. The number of distinguishable colors available for the purpose of image transmission depends on the resolving power with which such virtually monochromatic spectral colors can be separated from the continuous spectrum and determines in fact the number of image characteristics that can be transmitted. It is well known that suitable spectroscopic devices are presently available which are capable of resolving several hundred thousands of spectral lines in the visual spectrum.

The word "characteristic" is used to indicate each of a number of properties attributable to all of the image points of the image of which the transmission is desired to reproduce the image at the receiving end. Among such characteristics are:

(a) The place coordinates of image points. To identify the place of an image point in a line image only one characteristic, say the $x$-coordinate, is necessary. In the case of superficial or spatial images the $y$-coordinate or the $y$- and $z$-coordinates, respectively, have to be added as further characteristics for establishing the position of the image points.

(b) The natural color of image points. It will be remembered that, as a rule, the colors in which natural objects appear when they are illuminated with white light are not simple spectral colors and the word "natural" is used herein to distinguish such colors from the narrow color bands used in the invention. Such natural colors may be reproduced satisfactorily by combining two or more selected spectral colors in certain relative intensities. In the terms of the present invention the natural color is a characteristic of the image to be transmitted and the spectral colors into which the natural color may be divided for the purpose of reproduction are values or qualities of said characteristic.

(c) The contrast of image points. Usually object points will contrast with their surroundings by virtue of a difference in intensity of the light emitted, transmitted or reflected by the object point and its surroundings, respectively. The intensity of all the object points may be compared with a number of standard intensities and translated into one of a fixed number of contrast steps. Such relative intensity may be one of the characteristics of the image in accordance with the present invention.

The difference between the terms "characteristic" and "value or quality of a characteristic" should be well noted. "Characteristic" means the property per se, "value or quality of the characteristic" means the value or form which the relevant characteristic takes in the case of a particular point or combination of points.

The word "group" is used to indicate any collection or assembly of distinguishable colors as apart from such colors in other groups of the same order. The distinguishable colors within each group are not necessarily adjacent in a continuous spectrum.

The various features and objects of the present invention will be fully understood when reading the following detailed description of some of its embodiments, reference being had to the diagrammatic drawings in which:

FIGS. 1$a$, 1$b$, 2$a$ and 2$b$ are diagrams used to explain the principles of the invention;

Figure 6:
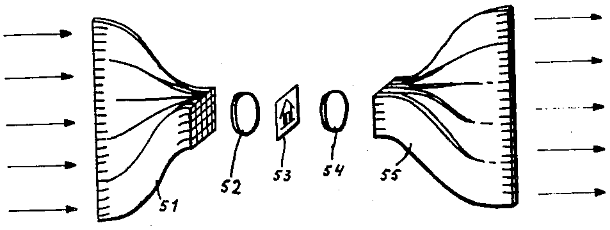
Figure 7:
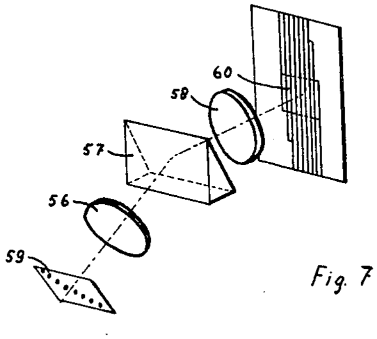
Figures 5, 5A, 5B:
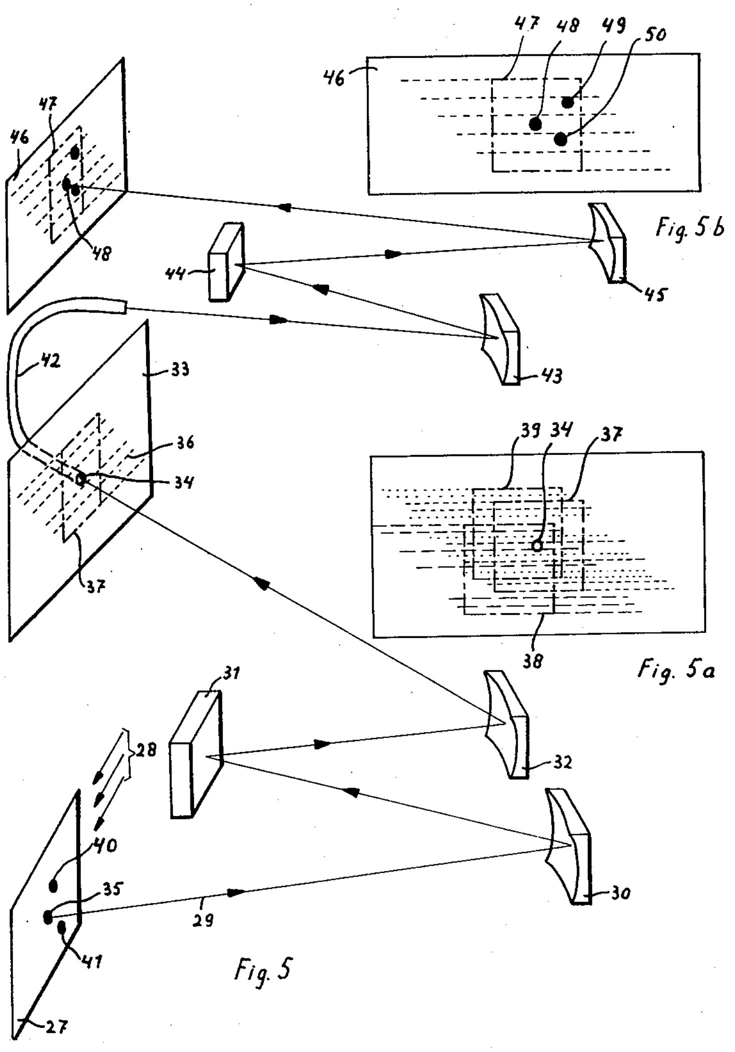
FIG. 5 is a second form of a system according to the invention.
Figure 8:
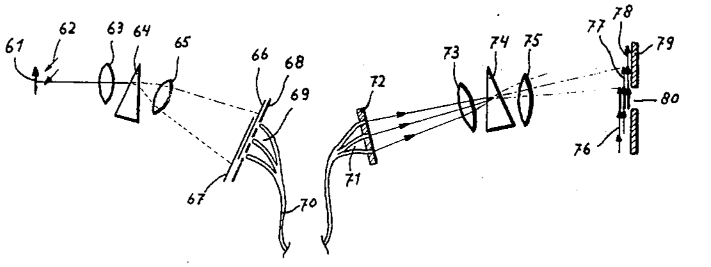
Figure 9:
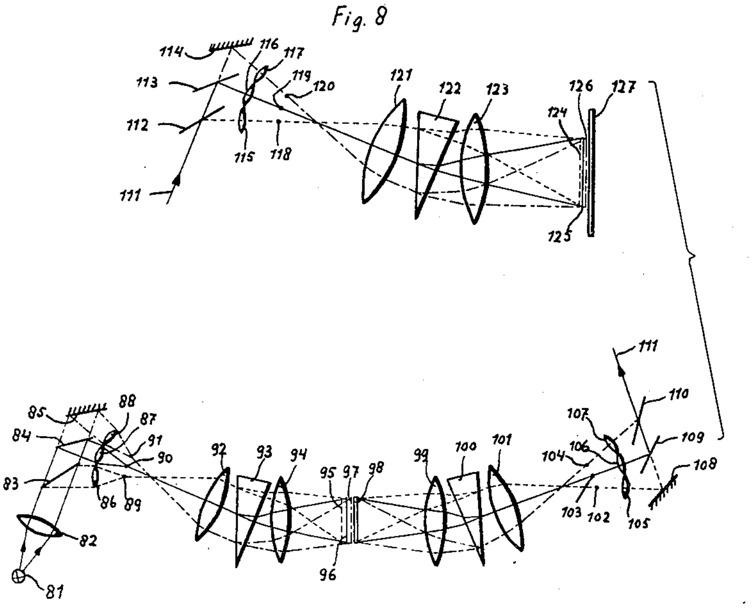

FIGS. 5*a* and 5*b* show details of the system of FIG. 5;

FIG. 6 shows a detail of a modified transmitter;

FIG. 7 shows a detail of another modified transmitter;

FIG. 8 is a first system in accordance with the invention for the transmission of images of colored objects;

FIG. 9 is a modified system for transmitting images of colored objects.

Figures 1A, 1B:
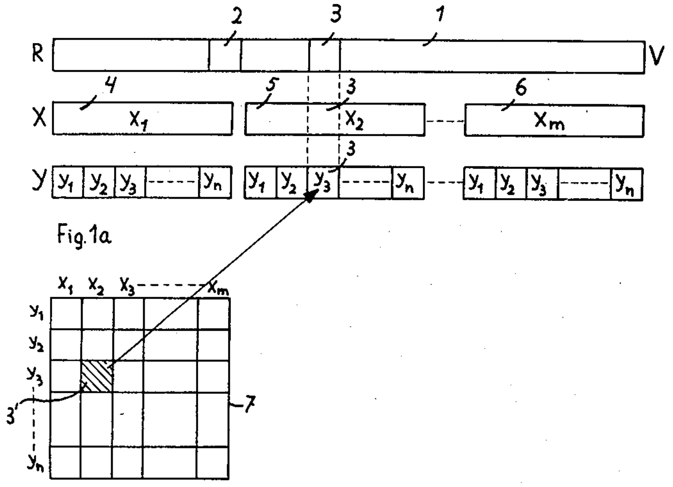
Figures 2A, 2B:
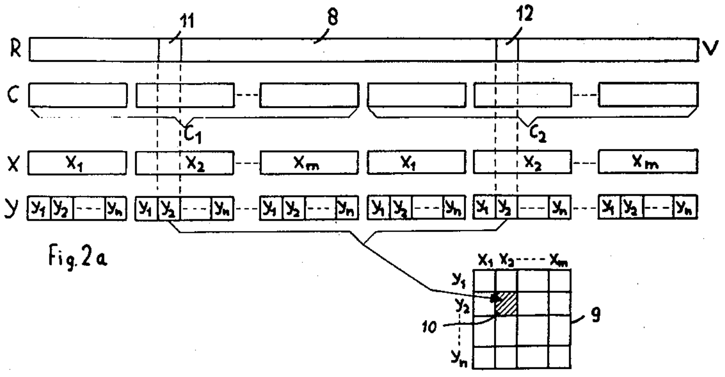

In FIG. 1*a* the reference number 1 designates a continuous spectrum of a visible light, such as may be obtained in a spectrograph. The spectrum is supposed to run from R (red) to V (violet) and is shown as a ribbon of narrow width. This line-spectrum may be considered as being made up of a large number of small spots, such as those indicated at 2 and 3, each of which represents a narrow frequency band of the light. In the image transmission techniques to which the invention relates these frequency bands or distinguishable spectral colors are used to represent image points in a single light beam which is transmitted to a receiving station. Several practical ways to make each of such spectral colors representative of only one image point will be discussed hereinafter. First the underlying principle of the invention as different from the known systems of this type will be explained as applied to systems for instantaneously transmitting two-dimensional black-and-white images (FIGS. 1*a* and 1*b*) and two-dimensional colored images (FIGS. 2*a* and 2*b*).

In FIG. 1*a* from the whole spectrum a number of groups shown as blocks 4, 5, . . . 6 are selected which contain equal numbers of distinguishable colors. It will be seen that the groups do not overlap so that no two groups will ever have any color in common. As the groups even do not join each other there are some colors in the spectrum which are not used in this example. In the blocks 4, 5, 6 notations $x_1$, $x_2$, $x_m$ have been placed to indicate that each of these groups represents a particular value $x_1$, $x_2$, . . . $x_m$ of the X-coordinate of the image. The X-coordinate is a characteristic of the image, as explained hereinbefore.

FIG. 1*b* shows schematically the image 7 to be transmitted as having a number of image points such as 3' which form vertical image lines $x_1$, $x_2$, $x_3$, . . . $x_m$ and horizontal image lines $y_1$, $y_2$, $y_3$, . . . $y_n$. All the points defining together a particular vertical line have the same value of the coordinate X, e.g. the value $x_2$. Thus, all the colors in the group 5 correspond to the same value of the image characteristic "X-coordinate" and are made to represent the image points in the vertical line $x_2$. It will be understood that the number of groups $x_1$ to $x_m$ must be equal to the number of vertical lines to be resolved in the image.

As shown in FIG. 1*b*, the groups *x* are subdivided in equal numbers of distinguishable colors, $y_1$, $y_2$, $y_3$ . . . $y_m$, which, of course, are different for each group.

The number of colors in each group *m* depends on the number of image points per line to be resolved. Each of the colors not only identifies the particular X-coordinate or vertical line to which the corresponding image point belongs but also the Y-coordinate or horizontal line through that point. For example, the color 3 of the spectrum is representative for the values $x_2$ and $y_3$ of two characteristics X and Y, respectively. Therefore, this color must represent the point 3' in FIG. 1*b*.

In this example, the intensity of the colors in the light signal transmitted may conveniently be used to represent the contrasts in the image in the conventional manner and as will be further described below. It is also possible, however, in accordance with the invention, to attribute to each point of the image a group of colors, e.g. ten, instead of only one, and to select only one out of this ten colors for transmission according to the intensity of the image point. In this way, the mere presence of a particular color in the transmitted light beam is also indicative of the intensity of the relevant image point, irrespective of the intensity of the color itself.

In FIG. 2*a* the spectrum 8 is divided in two groups of colors designated $C_1$ and $C_2$, of which the first is in the red-orange-yellow region and the second in the green-blue-violet region. Each of these two groups is divided into a number of sub-groups which are indicated $x_1$, $x_2$, . . . $x_m$ in both cases. Each of the sub-groups contains a number of distinguishable colors $y_1$, $y_2$, . . . $y_n$.

FIG. 2*b* shows the image 9 to be transmitted similarly to FIG. 1*b*. After the above discussion of FIGS. 1*a* and 1*b* it will be easily seen that the available colors of the first group $C_1$ are so attributed to the various image points that each color designates a certain value of both the X- and Y-coordinates and thus represents one particular point of the image 9.

The same procedure is applied, however, to the colors of the second group $C_2$. Hence, to each point *x*, *y* of the image two colors are allotted instead of one. One of these colors is in the red-orange-yellow region of the spectrum and the other in the green-blue, violet region. Let us suppose that the natural color of the point 10 ($x_2$, $y_2$) of the object contains a large component of light in the first half of the spectrum and practically no component in the second half. If we now select the intensities of the colors 11 and 12 which both represent the point $x_2$, $y_2$ such that the first one appears much more intense in the transmitted light beam than the second one, we will be able to approximately reproduce the natural color at the receiving side by simply adding these two spectral colors at the image point $x_2$, $y_2$. Thus, by dividing the available colors in two group $C_1$ and $C_2$ which each represent a quality, namely, a certain spectral component, of the characteristic "natural color" we make possible the transmission of colored images. The distinguishable colors, such as 11 and 12, represent, in addition to the place coordinates, the value or quality "orange" or "blue" of the latter characteristic. It is to be understood that we have discussed a system using only two groups of spectral colors for the purpose of natural color transmission merely by way of example and in order to be clear. A system which makes use of three or even more groups is very well feasible and will give more accurate color reproduction.

Figure 3:
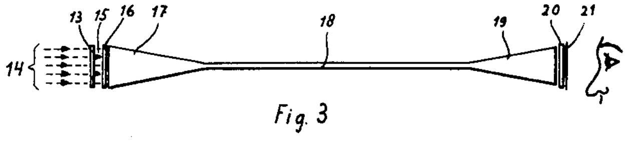
FIG. 3 shows a first system according to the invention.

In FIG. 3 item 13 is a transparent object such as a diapositive which is illuminated with a homogeneous beam 14 of non-monochromatic ("white") light. The object has substantial dimensions in two directions and bears a black-and-white image. The elementary light beams traversing the object are modulated in intensity in accordance with the opacity of the points of the object. Immediately behind the object 13 a graded color filter 16 is placed (in FIG. 3*a* small distance is left free between the object and the filter to show the elementary light beams 15). The transmission characteristic of the color filter varies from point to point such that from the elementary beams from each point only light of a particular spectral color is allowed to pass which is different from the spectral colors of each of the other object points. Such filters are presently available, i.e. in the form of interference filters. Accordingly, the position of any object point determines the color of the light originating from that point which is transmitted by the filter. Conversely, the relative position of the object point can be refound in the color of the light which is transmitted by that point. When the elementary light beams after having passed the filter are combined to a homogeneous light beam the image content will not get lost provided that the relative intensities of the beams are not changed.

Behind the color filter 16 the conical end 17 of a light conducting fibre or rod 18 is placed.

As is well known, such fibres may transport light energy by virtue of many internal total reflections of the light rays along relatively long and, eventually, curved paths to any desired distant point. Behind the conical distant end 19 of the light conductor 18 a second color filter 20 is placed whose color transmission characteristic is identical to that of the filter 16. Behind the filter 20 in the image plane 21 the image of the object 13 is reproduced, as each point of the filter 20 transmits only light which was transmitted by the corresponding point of the filter 16 and, hence, originated from the corresponding point of the object. Thus, the contrasts present in the object 13 are reproduced in the image which can be either viewed by an observer as shown or recorded on a panchromatic black-and-white film.

Figure 4:
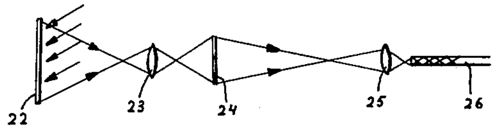
FIG. 4 is a modification of the transmitter part of the system of FIG. 3.

If the object is not suited to produce a "contact-image" on the color filter 16, e.g. because it is opaque or too large, means have to be provided to form an image of the object on the filter. In FIG. 4 we have shown that an object 22 which is illuminated with "white" light is imaged by a lens 23 on the graded color filter 24. It is also shown that a lens 25 may be used to form a strongly minified image of the filter on the end face of a light conductor 26 of constant diameter.

The place-color transformation occurring at the transmitting end in FIGS. 3 and 4 is such that all the points of the objects are illuminated with the same poly-chromatic (white) light. From the light which is transmitted or reflected by the object points only that color which is representative for each particular point is selected for transmission of the image space with the exception of all other colors. Such selection may be performed by color-selective absorption in absorption filters as illustrated in the simple example of FIGS. 3 and 4, or by color-selective refraction, deviation or reflection, examples of which will be given hereinafter. An analogous method can be applied in the case of self-luminant objects which emit light of a broad spectrum, since in that case the color-selection must take place in the beams emitted by the object.

This method of place-color transformation is contrary to the method which has been used in prior systems of this type and which consists in illuminating each object point exclusively with the spectral color which is to represent that point. The latter method has the disadvantage that is often very difficult to satisfactorily illuminate an object with a spectrum, e.g. in cases where the object has large dimensions or is at a large distance. It is much easier to make use of the natural white light which is available or to illuminate the object with conventional artificial light sources having a satisfactory spectral band width and a high intensity. Moreover, images of self-luminant objects can not be transmitted in the prior systems.

If it is desired, however, to perform the place-color transformation in FIGS. 3 and 4 in accordance with the conventional method, it is sufficient that e.g. in FIG. 3 the object 13 and the filter 16 are changed as in that case each object point receives light through the filter only of the particular color which is to represent that point in the light beam transmitted. In FIG. 4 on the place of the object 22 a transmission or reflection color filter may be positioned which receives white light from a suitable light source, and the object may be situated in the place of the filter 24.

The system of FIG. 5 is similar to that of the FIGS. 3 and 4 to the extent that the object is illuminated with "white" light and that a light conducting fiber is used as the transmission path. They differ, however, as regards the manner in which the elementary light beams are derived and combined to form the light beam to be transmitted, and the manner in which at the receiving station the image is composed.

In FIG. 5 which is a perspective view an opaque two-dimensional object 27 is illuminated with a beam 28 of white light. It is supported to be a black-and-white object which reflects elementary beams such as 29 all having the same percentual spectral composition as the illuminating beam 28 and being modulated in intensity according to the reflectively of the corresponding points of the object 27.

For deriving and combining the colors representing the points of the two-dimensional image, a special means must be provided which is capable of spreading the colors contained in a white light beam in the form of a "folded" spectrum which occupies a substantially rectangular surface on a receiving screen. As a first possibility, a number of continuous spectra may be produced which are projected side by side closely adjacent each other and are displaced respective to each other in the direction of their length to such an extent that of each of the spectra a different spectral region falls within the image area to be transmitted. Alternatively, a given continuous spectrum is divided into a number of partial spectra equal to the number of image lines to be resolved, and these partial spectra are made to lie side by side closely adjacent each other in such a manner as to fill the image area to be transmitted.

In the October 1952 issue of the Journal of the Optical Society of America spectrographic systems have been described which consist of crossed dispersing elements one of which is an echelle-grating. As mere fully described therein this grating produces a number of spectra (orders) overlapping each other and which, by means of the other dispersing element (prism or diffraction grating) crossed with the echelle, are laid side by side.

In the present invention each of the orders may represent a line or a value of one coordinate of the image. It appears that the subsequent orders are displaced with respect to each other to such an extent that a surface may be selected in which each point (elementary area) is illuminated with a different spectral color. Those portions of the orders which lie beyond that surface are not used. It will be understood that the two-dimensional spectrum thus obtained is suitable for the above described purpose. Other means, however, to derive a two-dimensional spectrum may be used such as a wedge-echelle which is crossed with a prism or diffraction-grating. Some examples of such elements will be described hereinafter.

The apparatus used in FIG. 5 to derive the colors on the transmitting side and to separate them on the receiving side, is of the type comprising an echelle-grating crossed by a reflection grating. The elementary light beams 29 reflected by the object 27 are collimated by a concave mirror 30 which reflects the light back to the echelle-grating 31 which is of the reflecting type. The concave diffraction-grating 32 receives the light from the echelle and focuses it on the plane of a diaphragm 33 which has a central aperature 34 whose dimensions correspond to the area occupied by one distinguishable color in the spectrum formed by the echelle-spectrograph, The spectra which correspond to a particular point 35 of the object have been shown in dotted lines and are designated 36. A substantially rectangular area 37 of the diaphragm 33 may be selected such that no color has more than one occurrence in this area. Of all the colors to be found in this area only one color derived from the object point 35 falls on the aperture 34; this color is representative for the object point 35. In like manner, each of the points of the object 27 produces a series of spectra in the plane of the diaphragm 33 and in each of these series a rectangular area similar to the area 37 and containing the same colors in the same configuration is found. It will be understood, however, that such two-dimensional spectra which are derived from different points of the object will have different positions with respect to the aperture 34 since, essentially, the spectrograph is an optical system projecting an image of the object onto the diaphragm 33 but, instead of reproducing the object points in the form of points, forms two-dimensional spectra having their center at the place where the respective image points would have been in the case of normal imagery. These two-dimensional spectra largely overlap each other and the aperture in the diaphragm is so positioned that of each of the spectra a different color is incident on the aperture.

In FIG. 5 for simplicity's sake there is shown only one two-dimensional spectrum 37 which corresponds to the object point 35. In FIG. *5a*, however, in addition to the spectrum 37, two other two-dimensional spectra 38 and 39 have been shown which correspond to the object points 40 and 41, respectively, in FIG. 5.

In the light passing through the aperture 34 a number of colors can be distinguished which are each representative for a particular object point and whose intensities are determined by the reflectivity of the respective object points. The light is picked up by a light conductor 42 which guides it to a distant receiving station. The receiver is provided with an echelle-spectrograph much similar to the one just described in connection with the transmitter and consisting of a concave mirror 43, an echelle-grating 44, and a concave diffraction-grating 45. Mirror 43 collimates the mixed beam leaving the light-conductor 42 and reflects the light toward the echelle 44. The latter, in turn, reflects the light back towards the concave, reflecting grating 45 which focuses it on the screen 46. Echelle-grating 44 divides the light into a number of spectra of different orders which are displaced relative to each other a certain distance in horizontal direction. The diffraction-grating 45 separates these orders in vertical direction so that on the screen 46 the orders appear as lying side by side. As explained for the transmitter, a substantially rectangular area 47 may be found on the screen 46 in which each point is illuminated with a different color. It will easily be seen that in this area an image of the object will be reproduced since, essentially the path of the light rays in the receiving spectrograph is the same as that in the transmitting spectrograph, the rectangle 47 being at the place of rectangle 37. In the same way as e.g. from the object point 35 only a part of the yellow light is incident on the aperture 34, it is a part of this color only which is incident on the point 48 of the area 47 which corresponds to the object point 35. Likewise, the blue and orange colors which represent e.g. object points 40 and 41 in the transmitted beam cannot be incident on points within the rectangle 47 other than the points 49 and 50 which correspond to such object points. The image projected onto the screen 46 and the image points to which reference was made are shown in FIG. *5b*.

The image 47 may be directly viewed on a ground glass in the plane of the screen or may be recorded on a panchromatic photographic film.

In FIG. 6 shows a means to "fold" a line-shaped spectrum, such as formed by a conventional prism- or diffraction-spectrograph, to a two-dimensional spectrum. It consists of a bundle of light-conducting fibers 51 which at one end are spread in a plane. The other ends of the fibers are taken up in groups corresponding to the height of the object and so placed that successive groups of fibers are lying side by side and together occupy e.g. a rectangular format, as shown in FIG. 6. The end of the bundle is imaged by a lens 52 on a transparent object 53 whose points modulate the colored elementary beams in accordance with the contrasts found in the object. Each of the elementary beams is thrown onto the end of the corresponding fiber of a fiber bundle 55 by a lens 54. The bundle 55 is arranged in the same manner as the fiber bundle 51 and spreads the two-dimensional spectrum to a line-shaped spectrum which can be transmitted in the conventional manner. In the receiver, of course, a fiber bundle of similar construction may be used to compose the two-dimensional image.

FIG. 7 illustrates a further method to form a two-dimensional spectrum which consists in deriving spectra displaced length-wise relative to each other from a row of separate "white" point sources. This can be achieved by means of a spectrograph, such as the prism spectrograph in FIG. 7, which consists of lenses 56 and 58 and a prism 57. The row of light sources as represented by the small apertures in the screen 59, is not parallel to the refracting edge of the prism 57 but is, to a sufficient extent, oblique thereto. The series of spectra 60 obtained thereby does not cover a rectangular area but has the form of a parallellogram in which lines connecting identical colors run parallel to one of the sides of the parallelogram. From this parallelogram an area can be selected such that each point thereof is illuminated with a different color.

It will be noted that for two-dimensional images not only "folded" spectra may be used, but also e.g. spectra which are spirally wound. Furthermore, the object and/or the image may be three-dimensional (spatial) instead of one- or two-dimensional, likewise as, in photography, the object is usually, and the image is sometimes three-dimensional. The arrangement of the spectral colors per se is not essential in the invention. The only essential point is that the available spectral colors are spread out over the points of the object and image (space, surface or line) in a reproducible manner.

In the example described hereinbefore, the object was supposed to be a black-and-white image having equal reflection- or absorption coefficients for all colors of the spectrum.

The systems described have the drawback that, in case the object is colored, the black-and-white reproduction of a certain natural color varies from place to place in the image. As regards the natural color of the object the system has the character of a black-and-white system which for all points has a very narrow spectral sensitivity varying from place to place.

As the natural colors of the objects have a larger spectral band width, this drawback becomes less important. It is even possible, according to the present invention, to transmit such wide band colors in good approximation on the basis of a system using two or more basic or primary colors.

In such a system there are formed two or more images of the colored object instead of one image. These images lie in different regions of the spectrum, e.g. one in the red, one in the yellow and a third in the blue region. Within each of these three regions each color identifies a different point in the object, similarly as described for the black-and-white systems. Each point of the object is represented in the transmitted light beam by three colors, i.e. one of each of the spectral regions. In the receiver these images are superposed such that the combined image appears in colors which are more or less true.

Hereinafter some examples of systems using three primary colors will be described. Of course, any other number of primary colors may also be used.

In FIG. 8 the one-dimensional object 61 is illuminated with incident white light 62. The color selection takes place here in a manner showing some analogy to the method applied in FIG. 5, by means of a spectrograph, consisting of the lenses 63 and 65, the prism 64 and the diaphragm 68. From each point of the object a spectrum is projected on the diaphragm 68. The spectras 66 and 67 derived from the extreme points of the object have been shown. The spectra 66 and 67 overlap each other for about ⅔ of their length. In the diaphragm 68 three apertures are provided at a mutual distance corresponding to nearly ⅓ of the length of the spectra, in such a way, that each aperture receives a part of each of the spectra.

The apertures are as wide as the spectral band that is used for one image point. For instance, from each object point only a color from e.g. the red region of the spectrum is incident on the upper aperture, a color from the yellow region on the central aperture and a color from the blue region on the lower aperture. In each aperture the whole spatial image content in the relevant "primary color" red, yellow or blue is present; so each aperture receives the image content of one "primary color." The number of image points, however, is reduced to about ⅓ of the number of image points possible in the case of one aperture which receives the complete spectrum.

Behind the apertures, the branched end 69 of a light conductor 70 is placed.

At the receiving end the light guide 70 is again branched into three ends 71. The three luminous end surfaces are imaged as three overlapping spectra 76, 77 and 78, on the screen 79 having an aperture 80 by means of a spectrograph consisting of the lenses 73 and 75 and the prism 74. The aperture 80 which is as large as the image, transmits only the overlapping parts of the spectra. From the right side of the screen e.g. on a ground glass, a single, but now colored, image can be seen. The image has now been transmitted by means of a three-primary-color system. These primary colors, however, are different from point to point in the image and, more over, are monochromatic.

The colored image received can be recorded on color film on condition that the latter has the proper sensitivity for the spectral bands used for transmission of the image.

In FIG. 9 a system having a higher light efficiency is shown. The losses in this system are practically reduced to those of the optical systems.

The light of a point source 81 is rendered parallel by means of a collimator lens 82. By means of the interference filters 83 and 84 and the mirror 85 the "white" light is divided into three broad spectral bands e.g. red, yellow and blue, according to the method described by Pohlach (see a.o. "Optics of thin films" by A. Vasicek, 1960, North Holland Publishing by Amsterdam, p. 239 ff.).

The parallel colored beams are focused in points 89, 90 and 91 respectively, by means of the achromatic lenses 86, 87 and 88 respectively. By means of a spectrograph, consisting of the lenses 92 and 94 and the prism 93, partial line spectra 95, 96 and 97 are derived which each cover about a third part of a continuous spectrum; these spectra coincide. However, they illuminate the transparent object 98 such that into each of the partial spectra an image of the object is modulated. By means of the lenses 99 and 101 and the prism 100 the modulated partial spectra are focused to three separate points 102, 103 and 104. There upon the partial beams are made parallel by the lenses 105, 106 and 107 respectively, then combined by means of the mirror 108 and the interference filters 109 and 110 to one beam 111, which is radiated. A part of the beam 111 is picked up by the receiver and again split into three colored beams by the interference filters 112 and 113 and the mirror 114. The transmission-, reflection- and/or absorption-characteristics of the filters 109 and 110 on one hand, and 112 and 113 on the other hand, should correspond, of course, to those of the filters 83 and 84, respectively. The three colored beams are focused by the lenses 115, 116 and 117 to the points 118, 119 and 120. The latter points act as light sources for the spectrograph consisting of the lenses 121 and 123 and the prism 122 and are so positioned relative to each other that the spectra 124, 125 and 126 derived therefrom coincide to form a colored image. This image can be projected e.g. onto a screen 127.

With proper construction and adjustment of the components shown in FIG. 9; the lenses 86, 87, 88, 92 and 101, 105, 106, 107 and 115, 116, 117, 121 can be omitted, if desired, as it is not strictly necessary to introduce an intermediate focusing of the parallel beams coming from lens 82, the prism 100 and the transmitter, respectively.

What we claim is:

1. A system for transmitting and receiving an optical image of an object which is capable of emitting polychromatic light along an optical path between a transmitting station and a receiving station, comprising, at said transmitting station, focusing means adapted to form an image of said object in a given plane, light dispersing means arranged in the optical path between said object and said given plane so that each elemental area of said object to be optically resolved by the system is reproduced as a spectrum in the image formed in said given plane, spectra of different elemental areas of said object having relative positions in said given plane in accordance with the relative positions of the respective elemental areas in the object, aperture means in said given plane adapted to pass light that is incident on said given plane within a small area corresponding in size to the elemental areas of the object, said small area being so positioned relative to said spectra that of each of the spectra a different elemental portion is incident on said small area and is passed by said aperture means, light combining means for combining the light passed by said aperture means for transmission, means for directing the combined light on said optical path to the receiving station, and, at said receiving station, light dispersing means to project a spectrum of the light received onto a receiving surface so that the relative positions of different elemental portions of the spectrum on the receiving surface correspond to the relative positions of corresponding elemental portions in the spectra in said given plane.

2. A system as claimed in claim 1 wherein means are provided for irradiating said object with polychromatic light.

3. A system as claimed in claim 1 wherein said object and its image are two-dimensional, said light dispersing means at said transmitting station and at said receiving station comprising two dispersing elements in crosswise arrangement, a first one of said elements being adapted to disperse the light in a first direction so as to form in said given plane and on said receiving surface, respectively, a multitude of superposed substantially line-shaped spectra which are displaced lengthwise relative to each other, and the other of said elements being adapted to disperse the light in a direction perpendicular to said first direction so that said line-shaped spectra are displaced transversely and are made to lie side by side adjacent each other.

References Cited by the Examiner

UNITED STATES PATENTS

| | | | |
|---|---|---|---|
| 2,813,146 | 11/57 | Glenn | 88—61 |
| 2,909,097 | 10/59 | Alden et al. | 88—24 |

FOREIGN PATENTS 780,976 8/57 Great Britain.

OTHER REFERENCES

Davidson: RCA TN Notes 136, March 7, 1958.

JEWELL H. PEDERSEN, *Primary Examiner.*

EMIL G. ANDERSON, FREDERICK M. STRADER, *Examiners.*